2,995,429
SOLID COMPOSITE RUBBER BASE AMMONIUM NITRATE PROPELLANT CURED WITH METAL OXIDE

Barney W. Williams, McGregor, Tex., David R. Smith, Bartlesville, Okla., and Wallace T. McMichael, Lake Jackson, Tex., assignors to Phillips Petroleum Company, a corporation of Delaware
No Drawing. Filed Mar. 26, 1956, Ser. No. 574,042
10 Claims. (Cl. 52—.5)

This invention relates to improved solid rocket fuels and to a method for their preparation. In one of its aspects this invention relates to a rocket fuel comprising a solid oxidant, a burning rate catalyst, and a polymeric material which is cured by a sulfur-free formulation. In another aspect this invention relates to a curing system for a polymeric material wherein magnesium oxide or zinc oxide is employed in effecting the cure of the polymeric material.

Recently it has been discovered that superior rocket fuel grains are obtained comprising a solid oxidant such as ammonium nitrate or ammonium perchlorate, and a rubbery material such as a copolymer of butadiene and a vinyl pyridine or other substituted heterocyclic nitrogen base compound, which after incorporation is cured by a quaternization reaction or a vulcanization reaction. Solid rocket fuel compositions of this nature and a process for their production are disclosed and claimed in co-pending application Serial No. 284,447, filed April 25, 1952, by W. B. Reynolds and J. E. Pritchard.

In the production of such solid rocket fuel grains, it is desirable that the binder component be cured so that the resulting rocket fuel grains will have good mechanical properties such as high values of elongation and tensile strength and low values of modulus of elasticity. It is also desirable that the rocket fuels have good burning rate and accordingly a burning rate catalyst is ordinarily incorporated into the composition.

It is an object of this invention to provide a simplified solid rocket fuel composition. It is another object to provide a sulfur-free solid rocket fuel composition. It is also an object of this invention to provide a simplified method for curing the binder material of a rocket fuel grain. It is a further object of this invention to provide a sulfur-free, quaternizing agent-free curing method for curing a copolymer of a conjugated diene and a heterocyclic nitrogen base wherein the desirable qualities of quaternization and sulfur vulcanization are obtained. Other objects and advantages will be apparent to one skilled in the art upon study of the disclosure of this invention.

Broadly, the invention contemplates the preparation of a solid rocket fuel composition comprising a solid oxidant, a combustion rate catalyst, and a binder comprising a rubbery copolymer of a conjugated diene and a heterocyclic nitrogen base wherein carbon black, a plasticizer, and a metal oxide constitute the sole ingredients added to the binder composition prior to incorporation therein of the oxidant and curing of the resulting composition.

We have discovered that a rocket fuel composition comprising an oxidant, such as ammonium nitrate, a burning rate catalyst, such as Milori blue, and a copolymer of a conjugated diene and a heterocyclic nitrogen base can be cured into a solid rocket fuel grain by the addition thereto prior to curing of zinc oxide or magnesium oxide. A reinforcing agent such as carbon black is utilized in such composition for the mechanical advantages thereby provided and a plasticizer is advantageously employed for ease of incorporation of the various ingredients.

We have discovered that the rocket fuel formulation of our invention provides the simplicity of process requirements and number of ingredients required by curing a binder composition by quaternization and at the same time provides the advantages of desirable mechanical and physical properties normally expected to be obtained by curing by sulfur vulcanization.

The amount of zinc oxide or magnesium oxide can be varied over a wide range to provide the cure of the composition since more than the amount required to effect the cure can be used without being harmful to the physical properties or ballististic characteristics of the rocket fuel. The amount of metal oxide required for cure of the copolymer binder will usually be in the range of 0.1 to 3 parts by weight per hundred parts by weight of copolymer. It may be desired to use more metal oxide in some cases and as much as 10 parts per hundred parts of polymer can be used.

The rubbery polymers employed as binders in the solid rocket fuel compositions of this invention are copolymers of conjugated dienes with polymerizable heterocyclic nitrogen bases of the pyridine series. These copolymers can vary in consistency from very soft rubbers, i.e., materials which are soft at room temperature but will show retraction when relaxed, to those having a Mooney value (ML-4) up to 100. The rubbery copolymers most frequently preferred have Mooney values in the range between 10 and 40. They may be prepared by any polymerization methods known to the art, e.g., mass or emulsion polymerization. One convenient method for preparing these copolymers is by emulsion polymerization at temperatures in the range between 0 and 140° F. Recipes such as the iron pyrophosphate-hydroperoxide, either sugar-free or containing sugar, the sulfoxylate, and the persulfate recipes are among those which are applicable. It is advantageous to polymerize to high conversion as the unreacted vinylpyridine monomer is difficult to remove by stripping.

The conjugated dienes employed are those containing from 4 to 6 carbon atoms per molecule and include 1,3-butadiene, isoprene, 2-methyl-1,3-butadiene, and the like. Various alkoxy, such as methoxy and ethoxy and cyano derivatives of these conjugated dienes, are also applicable. Thus, other dienes, such as phenylbutadiene, 2,3-dimethyl-1,3-hexadiene, 2-methoxy-3-ethylbutadiene, 2-ethoxy-3-ethyl-1,3-hexadiene, 2-cyano-1,3-butadiene, are also applicable in the preparation of the polymeric binders of this invention.

Instead of using a single conjugated diene, a mixture of conjugated dienes can be employed. Thus, a mixture of 1,3-butadiene and isoprene can be employed as the conjugated diene portion of the monomer system.

The polymerizable heterocyclic nitrogen bases which are applicable for the production of the polymeric materials are those of the pyridine, quinoline, and isoquinoline series which are copolymerizable with a conjugated diene and contain one, and only one,

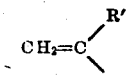

substituent wherein R' is either hydrogen or a methyl group. This is, the substituent is either a vinyl or an alpha-methylvinyl (isopropenyl) group. Of these, the compounds of the pyridine series are of the greatest interest commercially at present. Various substituted derivatives are also applicable but the total number of carbon atoms in the groups attached to the carbon atoms of the heterocyclic nucleus should not be greater than 15 because the polymerization rate decreases somewhat with increasing size of the alkyl group. Compounds where the alkyl substituents are methyl and/or ethyl are available commercially.

These heterocyclic nitrogen bases have the formula

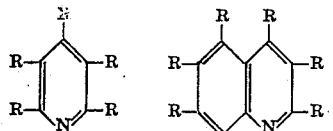

or

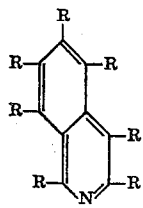

where R is selected from the group consisting of hydrogen, alkyl, vinyl, alpha-methylvinyl, alkoxy, halo, hydroxy, cyano, aryloxy, aryl, and combinations of these groups such as haloalkyl, alkylaryl, hydroxyaryl, and the like; one and only one of said groups being selected from the group consisting of vinyl and alpha-methylvinyl; and the total number of carbon atoms in the nuclear substituted groups being not greater than 15. Examples of such compounds are 2-vinylpyridine; 2-vinyl-5-ethylpyridine; 2-methyl-5-vinylpyridine; 4-vinyl pyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2 - methyl - 5-undecyl-3-vinylpyridine; 2,4-dimethyl-5,6-dipentyl-3-vinylpyridine; 2-decyl-5-(alpha-methylvinyl)pyridine; 2-vinyl-3-methyl-5-ethylpyridine; 2-methoxy-4-chloro-6-vinylpyridine; 3-vinyl-5-ethoxypyridine; 2-vinyl-4,5-dichloropyridine; 2-(alpha-methylvinyl)-4-hydroxy-6-cyanopyridine; 2-vinyl-4-phenoxy-5-methylpyridine; 2-cyano-5-(alpha-methylvinyl) pyridine; 3-vinyl-5-phenylpyridine; 2-(para-methyl-phenyl)-3-vinyl-4-methylpyridine; 3-vinyl-5-(hydroxyphenyl)-pyridine; 2-vinylquinoline; 2-vinyl-4-ethylquinoline; 3- vinyl-6,7-di-n-propylquinoline; 2 - methyl-4-nonyl-6-vinyl-quinoline; 4-(alpha-methylvinyl)-8-dodecylquinoline; 3-vinylisoquinoline; 1,6-dimethyl-3-vinylisoquinoline; 2-vinyl-4-benzylquinoline; 3-vinyl-5-chloroethylquinoline; 3-vinyl-5,6-dichloroisoquinoline; 2-vinyl-6-ethoxy-7-methylquinoline; 3-vinyl-6-hydroxymethylisoquinoline; and the like.

Oxidants which are applicable in the solid rocket fuel compositions of this invention include ammonium, alkali metal, and alkaline earth metal salts of nitric, perchloric, and chloric acids, and mixtures thereof. Ammonium nitrate and ammonium perchlorate are the preferred oxidants for use in the solid rocket fuels of this invention. Specific oxidants include sodium nitrate, potassium perchlorate, lithium chlorate, calcium nitrate, barium perchlorate, and strontium chlorate. Mixtures of oxidants are also applicable. In the preparation of the solid rocket fuel compositions, the oxidants are powdered to sizes preferably 10 to 300 microns average particle size. The amount of solid oxidant employed is usually a major amount of the total composition and is generally in the range between 50 and 90 percent by weight of the total mixture of oxidant and binder. If desired, however, less than 50 percent by weight of the oxidant can be used.

Combustion rate catalysts applicable in the invention include ammonium dichromate, metal ferrocyanides and metal ferricyanides. The complex metal cyanides are preferred. Ferric ferrocyanides, such as Prussian, Berlin, Hamburg, Chinese, Paris, and milori blue, soluble ferric ferrocyanide, such as soluble Berlin or Prussian blue which contains potassium ferric ferrocyanide, and ferric ferrocyanide which has been treated with ammonia, are among the materials which can be used. Ferrous ferricyanide, Turnbull's blue is also applicable. A particularly effective burning rate catalyst is milori blue which is a pigment similar to Prussian blue but having a red tint and is prepared by the oxidation of a paste of potassium ferrocyanide and ferrous sulfate. Other metal compounds such as nickel and copper ferrocyanides can also be employed. The amount of burning rate catalyst used, in the propellant compositions of this invention, are usually in the range of 1 to 60 parts per one hundred parts of rubbery polymer with from 5 to 50 parts being most frequently preferred. The amount of combustion catalyst will usually be 0.25 to 12 parts by weight per hundred parts of oxidant and binder.

Reinforcing agents include carbon black, wood flour, lignin, and various reinforcing resins such as styrene-divinylbenzene, methyl acrylate-divinylbenzene, acrylic acid-styrene-divinylbenzene, and methyl acrylate-acrylic acid-divinylbenzene resins. The reinforcing agent is usually used in an amount in the range of 10 to 50 parts by weight per hundred parts by weight of copolymer. The reinforcing agent can be omitted if desired.

In general, any rubber plasticizers can be employed in these binder compositions. Materials such as Pentaryl A (amylbiphenyl), ParaFlux (saturated polymerized hydrocarbon), Circosol-2XH (petroleum hydrocarbon softener having a specific gravity of 0.940 and Saybolt Universal viscosity at 100° F. of about 2000 seconds), dibutoxyethoxyethyl formal, and dioctyl phthalate are suitable plasticizers. Materials which provide rubber having good low temperature properties are preferred. It is also frequently preferred that the plasticizers be oxygen-containing materials. The amount of plasticizer used will be only that required to render the copolymer manageable during incorporation of the oxidizer and extruding the product. Ordinarily 15 to 30 parts by weight per hundred parts by weight of copolymer of plasticizer will be used although more or less can be used.

The various ingredients in the rocket fuel composition can be mixed on a roll mill or an internal mixer such as a Banbury or a Baker-Perkins dispersion blade mixer can be employed. The binder forms the continuous phase in the finished fuel composition with the oxidant as the discontinuous phase.

Rocket grains are formed by compression molding, injection molding or extrusion.

The curing temperature will generally be in the range between 70 and 250° F., preferably between 170 and 200° F.

The curing time must be long enough to give required creep resistance and other mechanical properties in the propellant. The time will generally range from around three hours when the higher curing temperatures are employed to 14 days when curing is effected at lower temperatures.

While this invention has been described using as the binder for rocket fuel compositions a copolymer of a conjugated diene with a polymerizable heterocyclic nitrogen base of the pyridine series, such as vinylpyridine and various alkyl-substituted derivatives, it is to be understood that the corresponding quinoline and isoquinoline compounds are also applicable, i.e., vinylisoquinolines and various alkyl-substituted derivatives of these compounds.

The following examples will be helpful in understanding the present invention but are not to be deemed as limiting the invention.

EXAMPLE I

Solid rocket fuel grains were made from a composition as set forth in the following table.

Table I

| Ingredients | Parts by Weight |
| --- | --- |
| Oxidizer (NH$_4$NO$_3$) | 81.9 |
| Binder | 16.2 |
| Milori blue | 2 |

The binder composition was prepared using a copolymer of 90 parts by weight 1,3-butadiene and 10 parts by weight 2-methyl-5-vinylpyridine containing 20 parts by weight carbon black per 100 parts by weight of copolymer. This composition was prepared in accordance with the following formulation.

Table II

| Ingredient | Parts by Weight |
| --- | --- |
| Butadiene/2-methyl-5-vinylpyridine | } 13.6 |
| Carbon black | |
| Dibutoxyethoxyethyl formal | 2.3 |
| Zinc oxide | 0.3 |

The various ingredients making up the total composition were thoroughly incorporated by mixing all of the ingredients so that a composition is obtained with the binder forming the continuous phase. The individual grains or specimens utilized as test specimens were extruded and formed prior to curing. The specimens were then cured at 170° F. and physical properties were determined periodically. Tensile strength specimens were 0.25 inch in thickness and were tested at 3 inches per second Cross Arm speed.

Table III

| Time and Temperature | Elongation, Percent | Tensile, p.s.i. | Modulus, p.s.i. |
| --- | --- | --- | --- |
| 1 week @ 170° F | 15 | 270 | 4,000 |
| 2 weeks @ 170° F | 7 | 320 | 5,900 |
| 4 weeks @ 170° F | 6 | 360 | 10,700 |

These data show that the rocket fuel grains were cured between the second and fourth weeks.

EXAMPLE II

Solid rocket fuel grains were made from a composition as set forth in the following table.

Table IV

| Ingredient | Parts by Weight |
| --- | --- |
| Oxidizer (NH₄NO₃) | 81.5 |
| Binder | 16.6 |
| Milori Blue | 2 |

The binder composition was prepared using a 90/10 butadiene/2-methyl-5-vinylpyridine copolymer as described in Example I. This composition was prepared in accordance with the following formulation.

Table V

| Ingredient | Parts by Weight |
| --- | --- |
| Butadiene/2-methyl-5-vinylpyridine | } 138.0 |
| Carbon black | |
| Dibutoxyethoxyethyl formal | 23.0 |
| Magnesium oxide | 4.9 |

The various ingredients making up the total composition were thoroughly incorporated by mixing the oxidizer, binder ingredients and the milori blue so that the binder material formed the continuous phase and the oxidizer formed the discontinuous phase in the final composition. The individual grains or specimens utilized as test specimens were extruded and formed prior to curing. The specimens were then cured at 170° F. and physical properties were determined periodically. The results of the tests are shown in Table VI.

Table VI

| Time and Temperature | Elongation, Percent | Tensile, lb./sq. in. | Modulus |
| --- | --- | --- | --- |
| 1 week at 170° F | 14 | 320 | 6,000 |
| 2 weeks at 170° F | 7 | 340 | 5,500 |
| 4 weeks at 170° F | 7 | 330 | 8,600 |

These results show that the compositions were cured between the second and fourth weeks.

The results of the examples show that a satisfactory cure of rocket fuel compositions can be obtained through the use of zinc oxide or magnesium oxide as the sole curing agent in connection with a rocket fuel composition comprising ammonium nitrate oxidizer, milori blue combustion catalyst, and a butadiene/2-methyl-5-vinyl-pyridine binder. Qualitative burning rate tests indicated that burning characteristics of these solid rocket fuels are completely satisfactory.

Reasonable variations and modifications are possible within the scope of the disclosure of the present invention, the essence of which is the discovery that a solid rocket fuel composition comprising an oxidizer, such as ammonium nitrate, a binder material comprising a rubber material, such as a copolymer of butadiene and 2-methyl-5-vinylpyridine and a combustion catalyst, such as milori blue, can be cured satisfactorily utilizing zinc oxide or magnesium oxide as the sole curing agent.

That which is claimed is:

1. An improved composition useful as a rocket fuel consisting essentially of about 50 to about 90 parts by weight of a solid inorganic oxidizing salt; 0.25 to 12 parts by weight of a burning rate catalyst selected from the group consisting of ammonium dichromate complex cyanides of iron, complex cyanides of nickel and complex cyanides of copper; 10 to 50 parts by weight of a rubbery copolymer of a conjugated diene having 4 to 6 carbon atoms per molecule and at least one

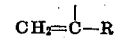

substituted heterocyclic nitrogen base selected from the group consisting of pyridine, quinoline, an alkyl substituted pyridine and an alkyl substituted quinoline, wherein the total number of carbon atoms in the nuclear alkyl substituents is not more than 15 and wherein R is selected from the group consisting of hydrogen and a methyl radical, from 0 to 50 parts by weight per hundred parts of said copolymer of carbon black and from 0 to 30 parts by weight per 100 parts of said copolymer of a rubber plasticizer; and 0.1 to 3 parts by weight per 100 parts of said copolymer of an oxide of a metal selected from the group consisting of zinc and magnesium.

2. The composition of claim 1 wherein the oxidizing salt is ammonium nitrate, the catalyst is milori blue, the copolymer is prepared from 1,3-butadiene and 2-methyl-5-vinylpyridine, and the metal oxide is magnesium oxide.

3. The composition of claim 1 wherein the oxidizing salt is ammonium nitrate, the burning rate catalyst is milori blue, the copolymer is prepared from 1,3-butadiene and 2-methyl-5-vinylpyridine, and the metal oxide is zinc oxide.

4. The composition of claim 1 wherein the oxidizing salt is ammonium perchlorate, the burning rate catalyst is milori blue, the copolymer is prepared from 1,3-butadiene and 2-methyl-5-vinylpyridine, and the metal oxide is magnesium oxide.

5. The composition of claim 1 wherein the oxidizing salt is ammonium perchlorate, the burning rate catalyst is milori blue, the copolymer is prepared from 1,3-butadiene and 2-methyl-5-vinylpyridine, and the metal oxide is zinc oxide.

6. An improved rocket fuel composition consisting essentially of 50 to 90 parts by weight of ammonium nitrate; 0.25 to 12 parts by weight of milori blue; 10 to 50 parts by weight of a copolymer of 1,3-butadiene and 2-methyl-5-vinyl-pyridine, 0.1 to 3 parts by weight per 100 parts of said copolymer of an oxide of a metal selected from the group consisting of zinc and magnesium; from 0 to 20 parts by weight per 100 parts of said copolymer of a carbon black; and from 0 to 30 parts by weight per 100 parts of said copolymer of a rubber plasticizer.

7. In the preparation of a composition useful as a rocket fuel comprising intimately admixing about 50 to about 90 parts by weight of a solid inorganic oxidizing salt, a burning rate catalyst selected from the group consisting of ammonium dichromate, complex cyanides of iron, complex cyanides of nickel and complex cyanides of copper in an amount of 0.25 to about 12 parts by weight, and about 10 to about 50 parts by weight of a conjugated dieneheterocyclic nitrogen base copolymer binder of a conjugated diene having 4 to 6 carbon atoms per molecule and at least one

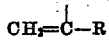

substituted heterocyclic nitrogen base selected from the group consisting of pyridine, quinoline, an alkyl substituted pyridine and an alkyl substituted quinoline, wherein the total number of carbon atoms in the nuclear alkyl substituents is not more than 15 and wherein R is selected from the group consisting of hydrogen and a methyl radical, 0 to about 50 parts per weight per 100 parts of said copolymer of carbon black, and 0 to about 30 parts by weight per 100 parts of said copolymer of a rubber plasticizer, the improvement which comprises admixing with said oxidizing salt-binder mixture from about 0.1 to about 10 parts by weight per 100 parts of copolymer of an oxide of a metal selected from the group consisting of magnesium and zinc and subjecting the resulting composition to a temperature in the range of about 70 to about 250° F. for a period of time in the range of about 3 hours to about 14 days.

8. The method of claim 7 wherein magnesium oxide is the sole curing agent.

9. The method of claim 7 wherein zinc oxide is the sole curing agent.

10. The improved method of preparing a solid composition useful as a rocket fuel which comprises intimately admixing 50 to 90 parts by weight of ammonium nitrate; 0.25 to 12 parts by weight of milori blue; 10 to 50 parts by weight of a copolymer of 1,3-butadiene and 2-methyl-5-vinylpyridine; from 0 to 20 parts by weight per 100 parts of said copolymer of carbon black; from 0 to 30 parts by weight per 100 parts of said copolymer of a rubber plasticizer; from 0.1 to 3 parts by weight per 100 parts of said copolymer of an oxide of a metal selected from the group consisting of magnesium and zinc; and subjecting the resulting composition to a temperature in the range of 70 to 250° F. for a period of time in the range of 3 hours to 14 days.

No references cited.